United States Patent [19]

Dall'osso et al.

[11] Patent Number: 5,131,413
[45] Date of Patent: Jul. 21, 1992

[54] SAFETY AND PROTECTIVE DEVICE FOR ASSOCIATION WITH A UNIT BY WHICH AT LEAST ONE CONTINUOUS CIGARETTE ROD IS DRIED AND SEALED IN CIGARETTE MANUFACTURING MACHINES

[75] Inventors: Davide Dall'osso, Bologna; Bruno Belvederi, San Martino di Monte San Pietro, both of Italy

[73] Assignee: G. D. Societa Per Azioni, Bologna, Italy

[21] Appl. No.: 778,355

[22] Filed: Oct. 17, 1991

[30] Foreign Application Priority Data

Oct. 18, 1990 [IT] Italy .................. 3702 A/90

[51] Int. Cl.$^5$ .......................................... A24C 5/26
[52] U.S. Cl. ........................................ 131/68; 131/67
[58] Field of Search .................. 131/68, 67, 84.1, 84.2

[56] References Cited

U.S. PATENT DOCUMENTS

| 3,194,244 | 7/1965 | Powell | 131/68 |
| 3,244,183 | 4/1966 | Pym | 131/68 |
| 3,557,797 | 1/1971 | Pym et al. | 131/68 X |
| 4,291,713 | 9/1981 | Frank | 131/68 |

FOREIGN PATENT DOCUMENTS 1039652 8/1966 United Kingdom .................. 131/68

Primary Examiner—Vincent Millin
Assistant Examiner—J. Doyle
Attorney, Agent, or Firm—Cushman, Darby & Cushman

[57] ABSTRACT

In a device ensuring safety and protection around the unit by which a cigarette rod is dried and sealed in cigarette manufacturing machinery, a hinged guard is positioned alongside the area of the machine where the heat plate of the drying and sealing unit moves and operates; the guard is capable of movement between a shut position denying access to the operating area and a position whereby access is afforded to the area. A microswitch senses when the guard is in the shut position, denying access to the operating area, and relays an enabling signal to the control valve piloting the cylinder by which the heat plate is lowered, only when the guard is in this same safe position.

2 Claims, 2 Drawing Sheets

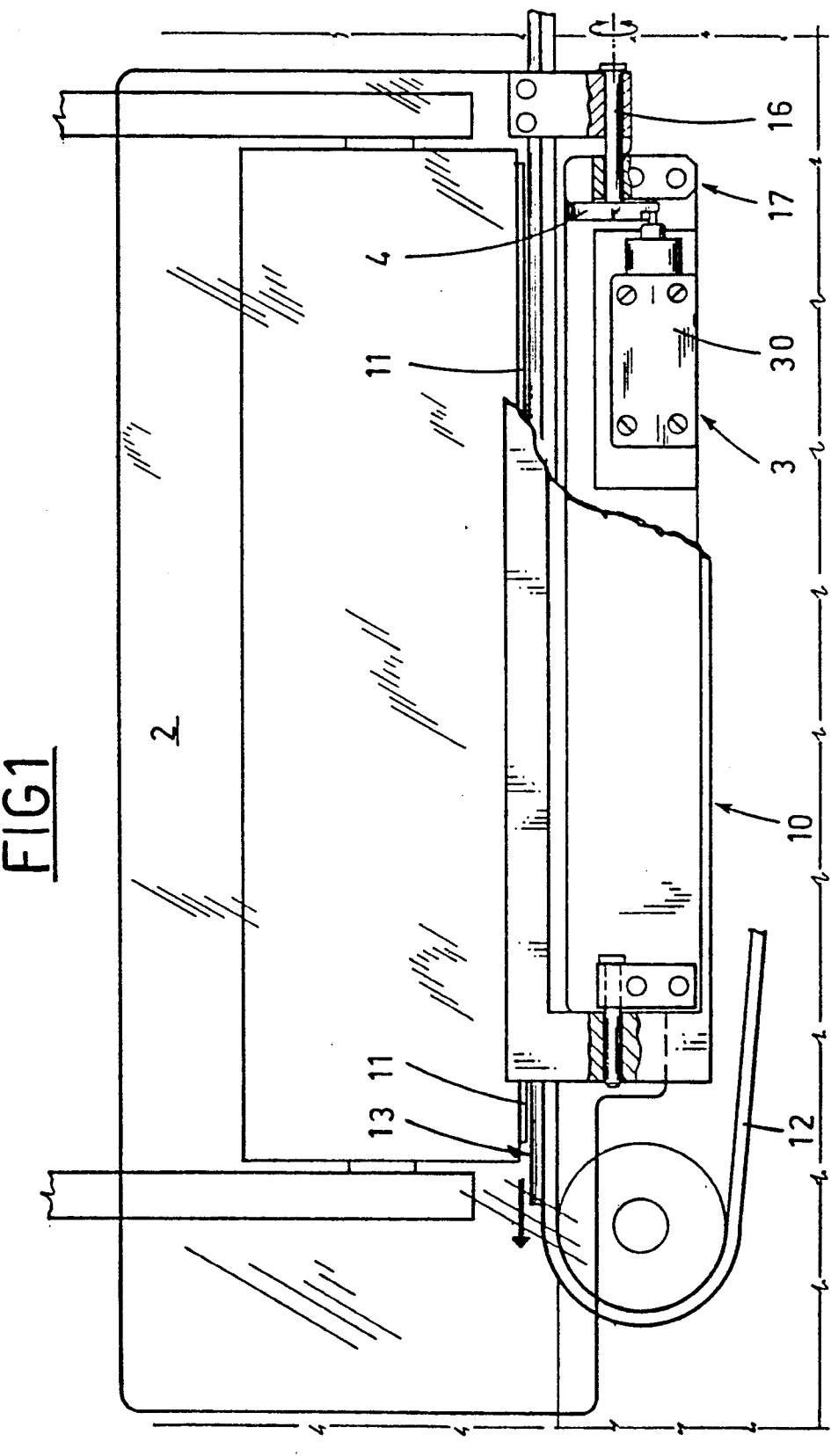

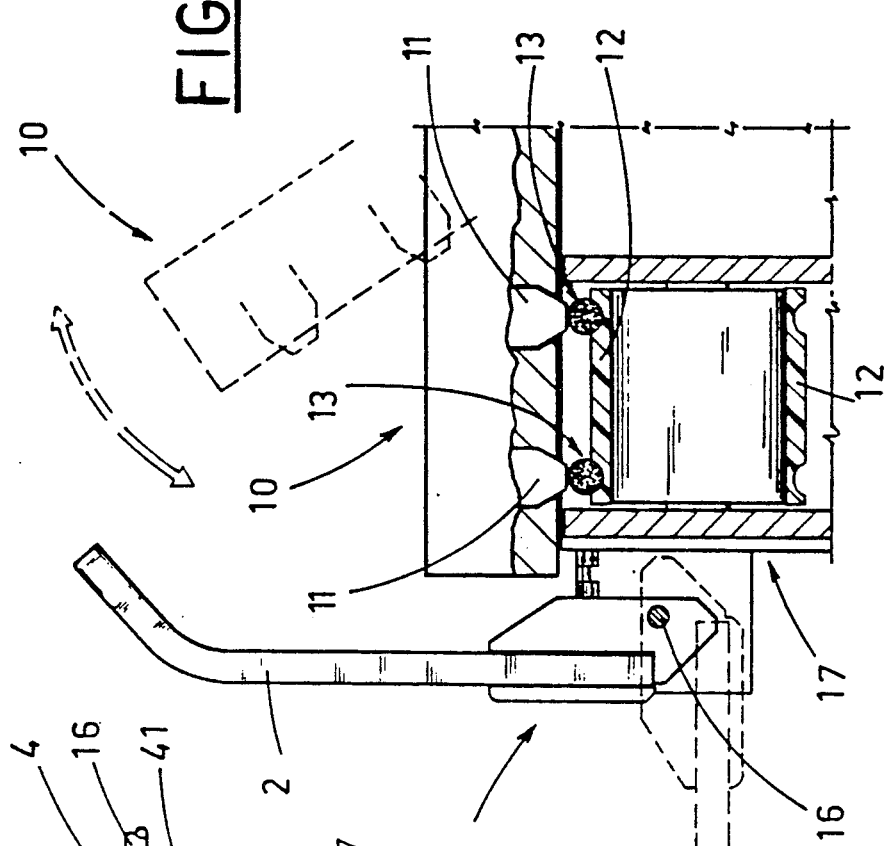
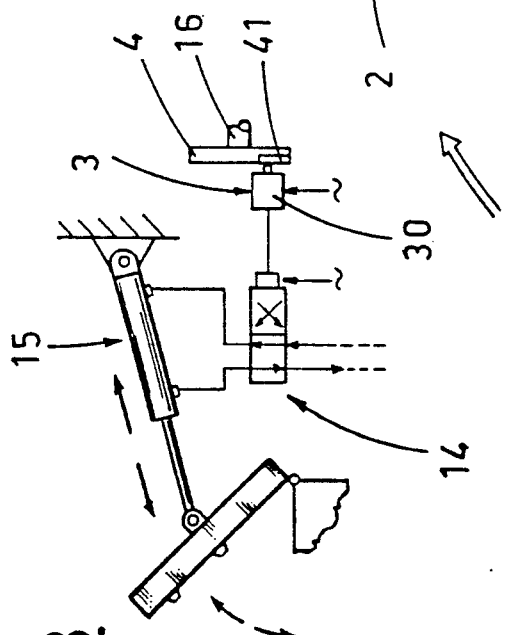

SAFETY AND PROTECTIVE DEVICE FOR ASSOCIATION WITH A UNIT BY WHICH AT LEAST ONE CONTINUOUS CIGARETTE ROD IS DRIED AND SEALED IN CIGARETTE MANUFACTURING MACHINES

BACKGROUND OF THE INVENTION

The present invention relates to a device ensuring safety and protection of the unit by which at least one continuous cigarette rod is dried and sealed, in cigarette manufacturing machines.

Machines of this type are designed to fashion at least one continuous cigarette rod, starting with a strip of paper uncoiled from a supply reel and a mass of shredded tobacco directed into the machine by suitable feed means.

Thereafter, the continuous rod is cut transversely into discrete lengths which may then undergo other manufacturing operations, for example the addition of a filter tip, before being conveyed ultimately to a wrapping machine.

The continuous rod is fashioned substantially by uncoiling and directing the strip of paper into a suitably profiled guide or channel appearing arched in cross section, of which the radius of curvature varies progressively until assuming a constant and substantially cylindrical shape of radius identical to that of the cigarette in production. Naturally enough, the shredded tobacco is directed into the channel together with the strip of paper.

Just prior to emergence of the final cylindrical shape in which the longitudinal edges of the strip of paper are overlapping and in mutual contact, a layer of gum is inserted between the joined edges by suitable applicators.

Immediately thereafter, the longitudinal edges of the strip are brought together and caused to bond one to the other, thereby moulding the strip into its final cylindrical shape around the filling of tobacco.

Once beyond the gumming station, the rod is cut into discrete lengths and conveyed to successive work stations.

Machines of the type in question are characterized by high operating speeds, hence high feed rates (of the strip first, and of the formed rod thereafter), such that the gum is often not completely dried at the moment when the transverse cut is effected. Clearly, a contingency of this nature can give rise to many drawback, given that an insecurely sealed cigarette rod could break open during the cutting operation, and the relative cutting means would soon become fouled if used to sever a rod in which the gum were not yet completely dried. To avoid such occurrences an intermediate drying and sealing unit is installed between the gumming and cutting stations, consisting essentially in a heat plate capable of movement between a position distanced from the cigarette rod, and a position close to the rod, substantially in contact with the overlapping longitudinal edges of the strip of paper. The movement of the plate toward the position of substantial contact is brought about automatically in most instances, when the cigarette manufacturing machine is set in motion.

This can be hazardous for the machine operator, however, who might encroach on the area in which the heat plate moves and operates precisely at the moment when the plate approaches the cigarette rod, resulting in injuries or burns. Accordingly, the object of the present invention is to overcome the drawback outlined above.

SUMMARY OF THE INVENTION

The stated object is realized in a device according to the present invention, intended for association with a cigarette manufacturing machine and serving to ensure safety and protection around a unit for drying and sealing at least one cigarette rod; such a unit comprises at least one heat plate positioned in close proximity to a conveyor belt by and on which the cigarette rod is supported and directed toward a successive work station, and capable of movement between a raised position distanced from the belt and a lowered position substantially in contact with the gummed overlapping longitudinal edges of the strip of paper enveloping the tobacco of the cigarette rod, also control and actuator means by which the heat plate is moved between the raised and lowered positions.

The essential features of the device disclosed are that it comprises at least one protective guard, disposed at least alongside the area of the machine in which the heat plate moves and operates and capable of movement between a shut position denying access to the operating area and an open position whereby access is afforded to the operating area, and sensing means capable at least of verifying when the guard is in the shut position, denying access to the operating area, and of supplying the control and actuator means with an enabling signal to allow the lowering movement of the heat plate toward the cigarette rod only when the guard is in the safe, shut position.

BRIEF DESCRIPTION OF THE DRAWINGS

The invention will now be described in detail, by way of example, with the aid of the accompanying drawings, in which:

FIG. 1 is the schematic front elevation of a safety and protective device according to the invention, associated with a cigarette manufacturing machine;

FIG. 2 is a schematic cross section through the device shown in FIG. 1;

FIG. 3 shows a possible arrangement for operation of the device illustrated in the previous drawings, associated with the drying and sealing unit of a cigarette manufacturing machine.

DESCRIPTION OF THE PREFERRED EMBODIMENTS

With reference to FIG. 1 of the drawings, 12 denotes a conveyor belt forming part of a machine for the manufacture of cigarettes, of which the function is to generate feed motion for a continuous cigarette rod denoted 13, or rather for two such rods 13 in the example of FIGS. 2 and 3.

10 denotes a drying and sealing unit that consists essentially in at least one heat plate 11 capable of movement between a position distanced from the cigarette rods 13 (illustrated with phantom lines in FIG. 2) and a position close to and substantially in contact with the rods (bold line in FIG. 2).

Each cigarette rod 13 consists essentially in a strip of paper rolled transversely to form a tube around a continuous filling of shredded tobacco, of which the longitudinal edges are gummed and brought into mutual overlapping contact. When in the close position, the heat plate 11 is disposed in contact with the overlapping edges of the strip.

A safety and protective device according to the invention, denoted 1 in its entirety, comprises a guard 2 positioned alongside the conveyor belt 12, and more exactly, alongside the area in which the heat plate 11 moves and operates.

The guard 2 is capable of movement, brought about manually or by power means not illustrated, between an open position affording access to the operating area of the heat plate 11 (phantom line, FIG. 2) and a shut position denying access to the selfsame area (as shown in FIG. 1, and by the bold line of FIG. 2). The device 1 also comprises means 3 by which to sense the position of the guard, and in particular the shut position in which access to the operating area is denied (FIG. 3).

Such sensing means 3 serve to relay an enabling signal to control means 14, which serve in turn to pilot the operation of actuator means 15 associated with the heat plate 11.

In the example of FIG. 3, sensing means 3 consist in a microswitch 30 interacting with a cam 4 connected mechanically to the guard 2, e.g. to a pivot 16 by way of which the guard is mounted and hinged to a frame 17 of the machine.

The output from the switch 30 is connected to a solenoid valve which provides the control means 14 aforementioned and pilots the operation of a fluid power cylinder providing the actuator means 15. The sensing means 3, control means 14 and actuator means 15 clearly might be of any given type other than described and illustrated; for example, the sensing means 30 might take the form of an encoder or a proximity sensor located near to the guard 2. Thus, when the guard 2 is distanced even by a small amount from the shut position denying access to the heat plate, there will be no enabling signal from the microswitch 30 to the solenoid valve 14, and the valve therefore cannot pilot the operation of the fluid power cylinder 15.

To gain increased safety, other systems might be adopted by means of which the heat plate 11 can be retracted or held away from the cigarette rods 13 in the event that the guard is separated even by a short distance from the shut position. For example, the actuator means 15 might consist in a single acting fluid power cylinder which keeps the heat plate 11 distanced from the cigarette rods 13 when in the depressurized configuration, in such a way that activation of the solenoid valve 14 causes the heat plate 11 to close down on the rods 13, whilst deactivation of the valve, whether programmed or triggered by the microswitch 30, will allow the cylinder 15 to retract.

What is claimed:

1. A safety and protective device in a cigarette manufacturing machine comprising, a unit for drying and sealing at least one continuous cigarette rod, equipped with at least one heat plate positioned in close proximity to a conveyor belt by and on which the cigarette rod is supported and directed toward a successive work station, capable of movement between a raised position distanced from the belt and a lowered position substantially in contact with the gummed overlapping longitudinal edges of the strip of paper enveloping the tobacco of the cigarette rod;

control and actuator means by which the heat plate is moved between the raised and lowered positions;

at least one protective guard, disposed at least alongside the area of the machine in which the heat plate moves and operates, and capable of movement between a shut position denying access to the operating area and an open position whereby access is afforded to the operating area;

sensing means capable at least of verifying when the guard is in the shut position, denying access to the operating area, and of supplying the control and actuator means with an enabling signal to allow the lowering movement of the heat plate toward the cigarette rod only when the guard occupies the shut position.

2. A device as in claim 1, wherein sensing means consist in a microswitch operating in conjunction with a cam connected mechanically to the guard and activated by the cam whenever the guard occupies the shut position denying access to the operating area, of which the output is connected to the input of control means embodied as a solenoid valve to the end of piloting the operation of actuator means embodied as a fluid power cylinder.

* * * * *